J. DODGE.
Draft-Equalizers.
No. 152,086. Patented June 16, 1874.
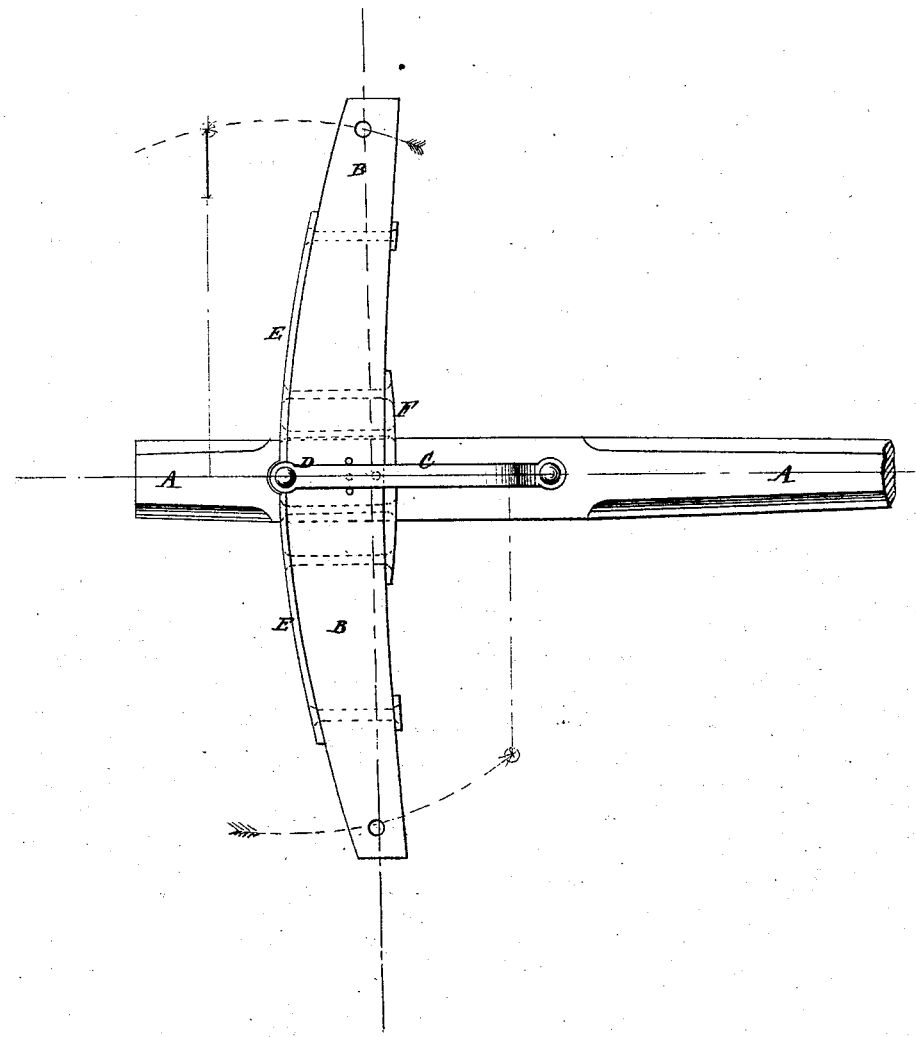

UNITED STATES PATENT OFFICE.

JOSIAH DODGE, OF GRASS VALLEY, CALIFORNIA.

IMPROVEMENT IN DRAFT-EQUALIZERS.

Specification forming part of Letters Patent No. 152,086, dated June 16, 1874; application filed February 7, 1874.

*To all whom it may concern:*

Be it known that I, JOSIAH DODGE, of Grass Valley, in the county of Nevada and State of California, have invented a new and useful Improvement in Double-Tree, of which the following is a specification:

The figure is a top view of my improved double-tree, shown as applied to a tongue.

My invention has for its object to furnish an improved double-tree, which shall be so constructed as to give the horse which may get in the rear of the other, and which is generally the weaker or slower, an advantage of leverage, so that he may be able to get even with the other horse while both horses are exerting their full strength, and without its being necessary to check or hold back the forward horse. The invention consists in the arrangement of the bolt or hammer hole of a double-tree in the rear of its axis, and in the iron strap or plate attached to the rear edge of the double-tree to sustain the draft-strain, as hereinafter fully described.

A represents a tongue, to which my improved double-tree B is secured by the hammer-strap C, and a bolt, pin, or hammer, D. The bolt D, that pivots the double-tree B to the tongue A, passes down at the rear edge of the double-tree B, as shown in the figure, so as to be in the rear of the axis of the said double-tree.

By this arrangement of the bolt-hole of the double-tree, should one end of the double-tree move to the rearward, that arm of the lever will become the longer, and will thus give the rear horse the advantage of leverage, and enable him to again get even with the other horse, even though he be the weaker, and both horses be exerting their full strength, so that it may be unnecessary to hold in the forward horse at a time when the full strength of both horses may be required.

When the bolt-hole is in the axis of the double-tree, both arms of the lever will be of the same length, whatever be the position of the double-tree. When the bolt-hole is forward of the axis of the double-tree, the forward horse will have the advantage of leverage, and the rear horse, though he be the weaker or slower, will have more than his share to draw, and will thus be unable to get even with the other horse, unless the said forward horse be checked, and thus prevented from exerting his full strength at a time when the full strength of both horses may be necessary.

E is an iron bar, strap, or plate, secured to the rear edge of the double-tree B by bolts or rivets, and which sustains the draft-strain.

The iron E may extend the whole length of the double-tree B, or only part of its length, as may be desired.

The double-tree B may be further strengthened by an iron, F, attached to its forward edge, if desired.

Having thus described my invention, I claim as new, and desire to secure by Letters Patent—

The double-tree B, curved on its rear side, and pivoted at the center thereof, combined with plates E F, as shown and described, for the purpose specified.

JOSIAH DODGE.

Witnesses:
JAS. K. BYRNE,
JAS. H. CAMPBELL,
WM. K. SPENCER.